United States Patent [19]

Fitzpatrick

[11] Patent Number: 4,538,089

[45] Date of Patent: Aug. 27, 1985

[54] GREEN LUMINESCENT CATHODE-RAY TUBE DEVICE WITH IMPROVED COLOR FILTERING SYSTEM

[75] Inventor: Brian J. Fitzpatrick, Ossining, N.Y.

[73] Assignee: North American Philips Corporation, New York, N.Y.

[21] Appl. No.: 548,065

[22] Filed: Nov. 2, 1983

[51] Int. Cl.³ .......................... H01J 31/00; H01J 5/16
[52] U.S. Cl. .................................. 313/478; 313/112; 350/312
[58] Field of Search ............... 313/371, 478, 466, 110, 313/112, 474; 350/311, 312

[56] References Cited

U.S. PATENT DOCUMENTS 3,971,932 7/1976 Sewell et al. ................... 313/388 X
4,106,857 8/1978 Snitzer ............................. 350/311

FOREIGN PATENT DOCUMENTS 2098393A 11/1982 United Kingdom ............... 313/478

Primary Examiner—David K. Moore
Assistant Examiner—K. Wieder
Attorney, Agent, or Firm—Norman N. Spain

[57] ABSTRACT

A filtering device for removing unwanted radiation from a green luminescing CRT comprises a solution of a soluble praseodymium salt, sodium fluorescein and Fast Green FCF.

15 Claims, 3 Drawing Figures

λ(nm)

λ(nm)

GREEN LUMINESCENT CATHODE-RAY TUBE DEVICE WITH IMPROVED COLOR FILTERING SYSTEM

BACKGROUND OF THE INVENTION

This invention relates to a new and novel CRT device for generating a bright green light spot of the type that is particularly useful for projection color television and information display.

Green light radiation for use in projection color television generally is produced by the electronic bombardment of a green luminescent terbium activated phosphor such as a terbium activated yttrium oxysulfide phosphor. While the terbium activated phosphor when excited by electronic bombardment produces a high amount of the desired fundamental radiation at 544 nm, significant amounts of troublesome radiations at 490 nm, 586 nm and 620 nm are also produced. While the radiation at 586 nm is most troublesome as this radiation is the closest to the fundamental radiation and can cause blurring of the image when the 544 nm radiation is brought into focus, additional blurring can also be caused by the presence of the 490 nm and 620 nm radiations. In addition the presence of these radiations at 490 nm and 620 nm distorts the resultant image.

In order to significantly decrease the radiation at 586 nm, while causing essentially no reduction of the desired emission at 544 nm, the applicant, in his co-pending patent application Ser. No. 453,379, filed Dec. 27, 1982, teaches the use of a filtering composition comprising a solution of a soluble praseodymium salt. While the praseodymium salt containing filtering solution of this co-pending patent application significantly reduces the radiation at 586 nm while causing practically no decrease in the desired radiation at 544 nm it has only a very small effect on the undesired radiation at 490 nm, and no effect on the radiation at 620 nm.

British Patent application U.K. No. 2098393A to Sony Corporation discloses a green luminescent cathode ray tube containing a terbium activated yttrium oxysulfide phosphor and a filtering composition containing a mixture of brilliant blue and methyl orange for reducing the undesired radiations at the 490 nm, the 586 nm and the 620 nm lobes. While the filtering solution of the British patent does indeed substantially reduce these undesired radiations it also results in a very large undesired decrease in the desired radiation at 544 nm.

BRIEF SUMMARY OF THE INVENTION

A principal object of this invention is to provide a cathode-ray tube (CRT) device for generating a brilliant green light spot in which a terbium activated phosphor is employed and there is a significant suppression of undesired radiations at 490 nm, 586 nm and 620 nm, with little or no suppression of the desired radiation at 544 nm.

Another object of this invention is to provide an externally liquid cooled CRT device for generating a bright green light spot for projection television and information displays in which a terbium activated luminescent material is employed and troublesome radiation at the 490 nm, 586 nm and 620 nm lobes are suppressed without significant reductions of the desired radiation at 544 nm.

These and other objects of the invention will be apparent from the description that follows. According to the invention the applicant has developed a new and novel CRT device for generating a bright green light spot employing a terbium activated phosphor capable of emitting green radiation when excited by electrons and in which device, outside of the face plate portion of the tube envelope and in the path of the green radiation, there is positioned, a transparent light filtering means comprising a concentrated solution of a soluble praseodymium salt, sodium fluorescein and Fast Green FCF. It has been found quite unexpectedly that the light emitted from the CRT device of the invention is practically free of the troublesome radiations at the 490 nm, 586 nm and 670 mn lobes with practically no decrease in the desired radiation at 544 nm.

DETAILED DESCRIPTION OF THE PREFERRED EMBODIMENTS

Any concentrated solution containing a soluble praseodymium salt, the sodium fluorescein and the Fast Green FCF may be employed. However, the solution preferably contains 6% to 13% by weight as the filtering solution of praseodymium salt, 0.008 to 0.012% by weight of the sodium fluorescein and 0.00005% to 0.0012% by weight of the Fast Green FCF. It has been found that the most useful solution is obtained when the concentration of the praseodymium salt is from 6% to 7% by weight, the sodium fluorescein is from 0.010% to 0.012% by weight and the Fast Green FCF is from 0.00005% to 0.0001% by weight.

The solvent employed is a combination of water and alcohol such as ethylene glycol, 1,2-propylene glycol, 1,3-propylene glycol, glycerol, ethanol, propanol, isopropanol and methanol.

Preferably up to 80% by weight of the solvent consists of the alcohol as in such a case the solution may also serve as an excellent coolant for the tube during operation while at the same time it is highly resistant to freezing during storage. Most preferably the solvent consists of about 50% by weight of ethylene glocol and 50% by weight of water.

Preferably the solution is carried on the external surface of the face plate of the tube and is held in place by a glass plate or other transparent member sealed to the external surface of the face plate. In such a position the solution not only serves as a light filtering means but also as a coolant for the tube.

However, if no coolant effect is desired, the solution need not be carried directly on the external surface of face plate but may be contained in a sealed transparent container removably positioned outside of the external surface of the face plate and in the path of the radiation emitting from the phosphor.

Preferably the index of refraction of the container matches that of the face plate.

Any water soluble praseodymium salt may be employed, examples of which are praseodymium acetate, praseodymium bromide, praseodymium chloride, praseodymium iodide and praseodymium nitrate. The praseodymium nitrate is preferred.

Any terbium activated phosphor capable of producing green radiation when excited by electrons may be employed in the CRT device of the invention, examples being terbium activated yttrium oxysulfide (P45), terbium activated lanthanum oxysulfide (P44), and terbium activated yttrium aluminum garnet (P53) all of which are described in "Optical Characteristics of Cathode Ray Tube Screens", (Dec. 1980) Electronic Industries Association, Washington, D.C., and a terbium activated strontium orthophosphate such as is disclosed in U.S. Pat. No. 3,606,324.

The phosphor material may be present in the cathode ray tube as a luminescent screen coated on the inner surface of the face plate but may also be in the form of a single crystal only the surface of which is activated.

Figure 1:
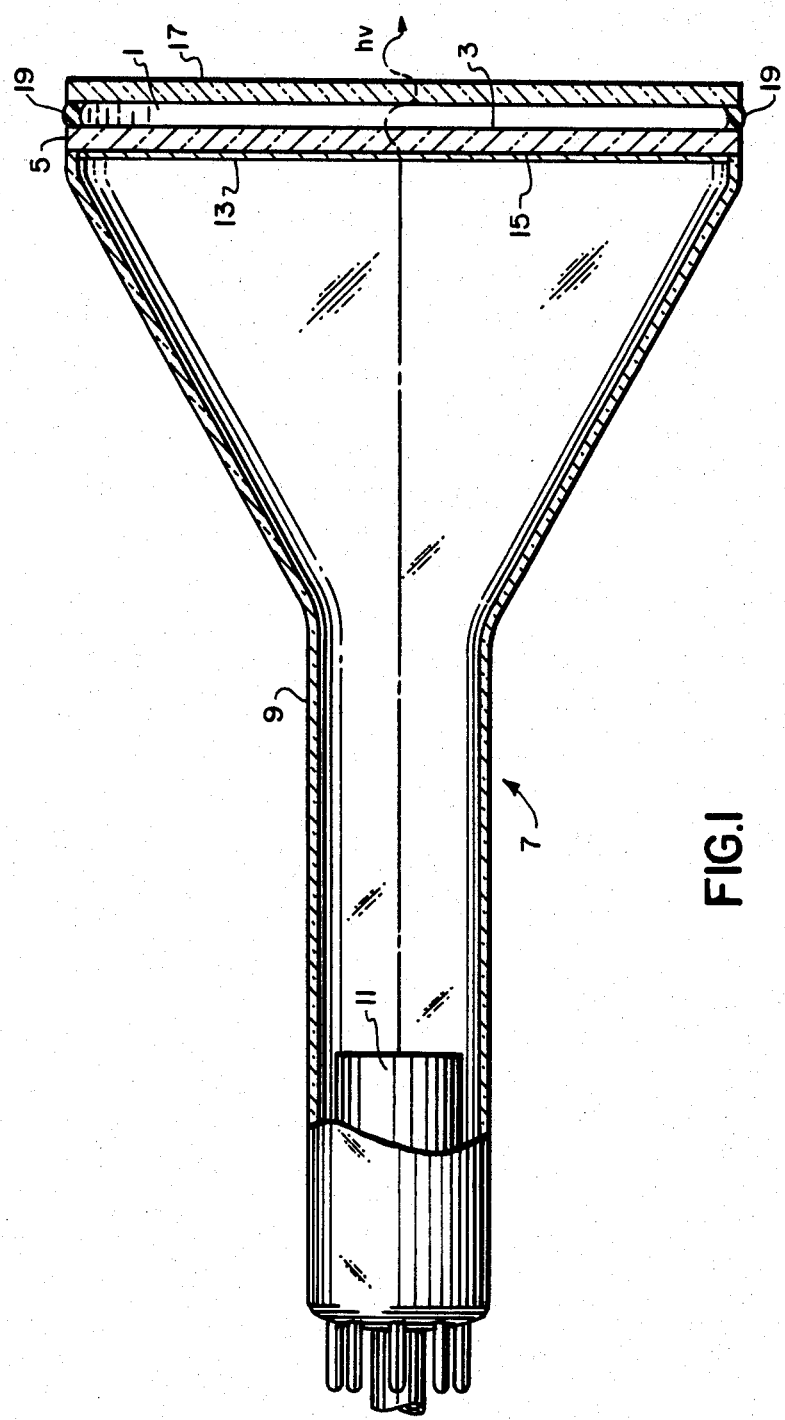
FIG. 1 is a cross-sectional view of a CRT device of the invention.

For a more complete understanding of the invention, the invention will now be described in greater detail with reference to FIG. 1 of the drawing which is a cross-sectional view of the preferred embodiment of the CRT device of the solution. A solution of 4 mg of Na-fluorescein, 1.4 g of $Pr(NO_3)_3$ and 0.02 mg of Fast Green FCG in 25 ml of a 50% water 50% ethylene glycol solvent is prepared. A 5 mm thick layer of the resultant light filtering solution 1 is applied to the external surface 3 of the glass face plate 5 of a cathode-ray tube 7 supplied with envelope 9 and containing an electron gun 11 positioned to emit a beam of electrons impinging on the surface of a green fluorescing luminescent screen 13 formed of terbium activated yttrium oxysulfide (P45) phosphor deposited on the internal surface of the face plate 5. The solution layer 1 is held in place on the external surface 3 of the face plate 5 by transparent cover plate 17 and seals 19.

The light output of this CRT device upon excitation of the luminescent screen electrons is scanned with a monochromator in the wavelength of 480 nm to 625 nm. The recorded result is shown in the graph of FIG. 2 of the drawing in which the wavelength in nm is plotted on the abscissa and the measured intensity in arbitrary units is plotted on the ordinate.

In a similar fashion the light output produced by an identical CRT device except for the omission of the praseodymium salt, the sodium fluorescein and the Fast Green FCG from the filtering solution is scanned in the same wave length range. The recorded result is shown in the graph of FIG. 3 of the drawing.

Figure 2:
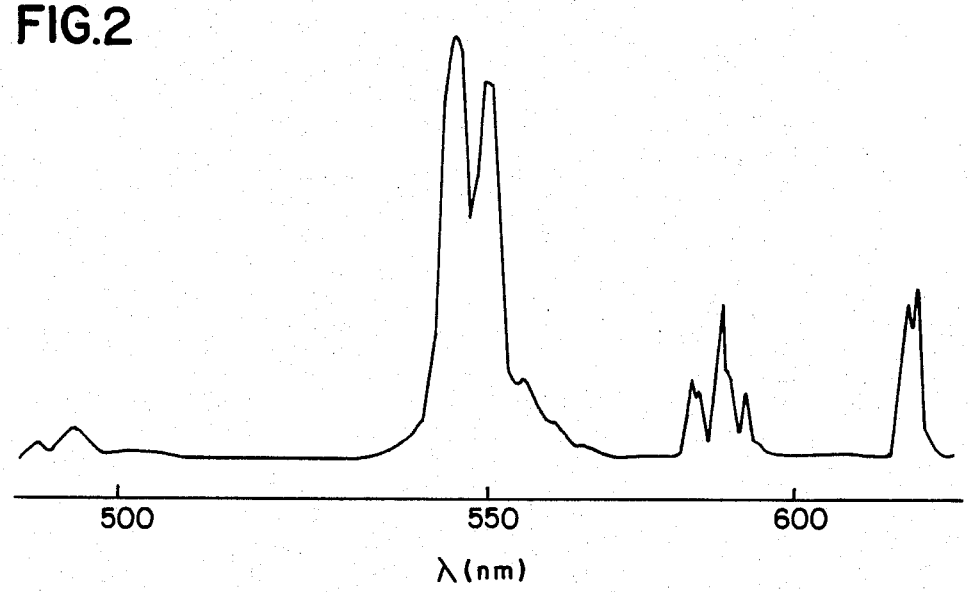
FIG. 2 is a graph showing the spectral energy distribution of the radiation emitted from a CRT device of the invention in the range of 480 to 625 nm.
Figure 3:
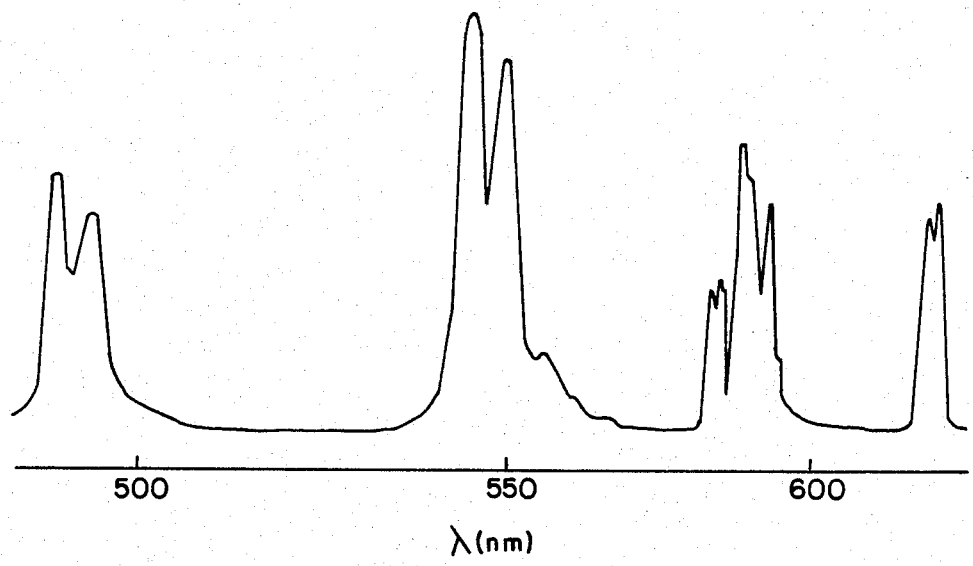
FIG. 3 is a graph showing the spectral energy distribution of the radiation emitted from an identical CRT device without the light filtering means of the invention.

As inspection of the results shown in the graph of FIG. 2 and in the graph of FIG. 3 the use of the filtering solution containing the praseodymium salt, the sodium fluorescein and the Fast Green FCG results in a very large reduction of the undesired lines at the 490 nm, the 586 nm and the 620 nm lobes while leaving the desired main lines essentially unchanged.

While the present invention has been described with reference to particular embodiments thereof, it will be understood that numerous modifications can be made by those skilled in the art without actually departing from the scope of the invention.

What I claim is:

1. A cathode-ray tube device for generating a bright green light spot comprising;
    a cathode-ray tube including an evacuated envelope, means, located within said envelope, to generate an electronic beam, a terbium activated phosphor, capable of emitting radiation when excited by electrons, positioned within said envelope and in the path of said electron beam and a transparent face plate forming part of said envelope is situated in the path of said green radiation, and positioned outside of the outer surface of said face plate and in the path of said green radiation, a light beam filtering means comprising in a container which at least in the path of said green radiation is transparent to said radiation, a concentrated solution of a soluble praseodymium salt, sodium fluorescein and Fast Green FCF.

2. The cathode-ray tube device of claim 1 wherein the solution solvent water and an alcohol is selected from the group consisting of ethylene glycol, 1,2-propylene glycol, 1,3-propylene glycol, glycerol, methanol, ethanol, propanol, isopropanol and benzyl alcohol, and mixtures thereof.

3. The cathode-ray tube device of claim 2 wherein the praseodymium salt is selected from the group consisting of praseodymium acetate, praseodymium chloride, praseodymium bromide, praseodymium iodide and praseodymium nitrate.

4. The cathode-ray tube device of claim 3 wherein the solution contains from 6% to 13% by weight of the praseodymium salt, 0.008% to 0.012% by weight of the sodium fluorescein and 0.00005% to 0.0001% by weight of the Fast Green FCF.

5. The cathode-ray tube of claim 4 wherein the solution contains about 6% to 7% by weight of praseodymium salt, 0.010% to 0.012% by weight of the sodium fluorescein and 0.00005% to 0.0001% by weight of the Fast Green FCF.

6. The cathode-ray tube device of claim 2 wherein the solvent is a mixture of water and up to 80% by weight of ethylene glycol.

7. The cathode-ray tube device of claim 3 wherein the solvent is a mixture of water and up to 80% by weight of ethylene glycol.

8. The cathode-ray tube device of claim 4 wherein the solvent is a mixture of water and up to 80% by weight of ethylene glycol.

9. The cathode-ray tube device of claim 7 wherein the praseodymium salt is praseodymium nitrate.

10. The cathode-ray tube device of claim 8 wherein the praseodymium salt is praseodymium nitrate.

11. The cathode-ray tube device of claim 10 wherein the solution contains about 6% by weight of praseodymium nitrate, about 0.010% by weight of sodium fluorescein and about 0.0005% by weight of Fast Green FCF in a 50% water - 50% ethylene glycol solution.

12. The cathode-ray tube device of claim 1 wherein the light filtering means is sealed to the outer surface of the face plate.

13. The cathode-ray tube device of claim 2 wherein the light filtering means is sealed to the outer surface of the face plate.

14. The cathode-ray tube device of claim 9 wherein the light filtering means is sealed to the outer surface of the face plate.

15. The cathode-ray tube device of claim 11 wherein the light filtering means is sealed to the outer surface of the face plate.

* * * * *

UNITED STATES PATENT AND TRADEMARK OFFICE
CERTIFICATE OF CORRECTION

PATENT NO. : 4,538,089
DATED : August 27, 1985
INVENTOR(S) : BRIAN J. FITZPATRICK It is certified that error appears in the above-identified patent and that said Letters Patent is hereby corrected as shown below:

Column 4, line 2, after "emitting" insert --green--;

line 5, change "is" to --and--;

line 15, after "solvent" insert --is-- and cancel "is";

line 31, after "of" insert --the--;

Signed and Sealed this

Twenty-sixth Day of November 1985

[SEAL]

Attest:

DONALD J. QUIGG

Attesting Officer

Commissioner of Patents and Trademarks